United States Patent
Yang

(10) Patent No.: US 9,616,754 B2
(45) Date of Patent: Apr. 11, 2017

(54) APPARATUS FOR PROTECTING PASSENGER FROM DAMAGE OF BATTERY BY LIGHTNING AND METHOD OF THE SAME

(71) Applicant: Hyundai Motor Company, Seoul (KR)

(72) Inventor: Hee Tae Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 7 days.

(21) Appl. No.: 14/621,041

(22) Filed: Feb. 12, 2015

(65) Prior Publication Data
US 2016/0144718 A1    May 26, 2016

(30) Foreign Application Priority Data
Nov. 21, 2014    (KR) ........................ 10-2014-0163623

(51) Int. Cl.
*B60L 3/00*    (2006.01)
*G01S 19/13*   (2010.01)
(Continued)

(52) U.S. Cl.
CPC ............ *B60L 3/0046* (2013.01); *B60L 1/003* (2013.01); *B60L 3/04* (2013.01); *B60L 3/12* (2013.01); *B60Q 9/00* (2013.01); *G01S 19/13* (2013.01); *H02H 1/0007* (2013.01); *B60L 2240/545* (2013.01); *B60L 2240/547* (2013.01); *B60L 2240/549* (2013.01); *B60L 2240/622* (2013.01); *B60L 2240/662* (2013.01); *B60L 2240/667* (2013.01); *B60L 2250/10* (2013.01);
(Continued)

(58) Field of Classification Search
None
See application file for complete search history.

(56) References Cited

U.S. PATENT DOCUMENTS

| | | | |
|---|---|---|---|
| 2012/0070706 A1 | 3/2012 | Miyazaki et al. | |
| 2012/0090861 A1* | 4/2012 | Goodson | F17D 5/08 169/61 |
| 2013/0337296 A1* | 12/2013 | Cardoso | H01M 2/12 429/61 |

FOREIGN PATENT DOCUMENTS

| | | |
|---|---|---|
| JP | 2012-070482 A | 4/2012 |
| KR | 10-0962242 B1 | 6/2010 |

(Continued)

OTHER PUBLICATIONS

Korean Notice of Allowance dated Apr. 21, 2016 in Korean Patent Application No. 10-2014-0163623.

*Primary Examiner* — John R Olszewski
*Assistant Examiner* — David Merlino
(74) *Attorney, Agent, or Firm* — McDermott Will & Emery LLP

(57) ABSTRACT

The present technology discloses an apparatus for protecting a passenger who boards a vehicle at the time of lightning and a method thereof. An apparatus for protecting a passenger includes a receiver configured to receive positional information of a vehicle and weather information, a gas detection sensor configured to detect an electrolyte gas within a battery duct, an air pressure sensor configured to detect an air pressure of tire, and a controller configured to control an opening and closing of the battery duct depending on the positional information, the weather information, the detected result of the gas detection sensor, and the detected result of the air pressure sensor.

12 Claims, 2 Drawing Sheets

(51) Int. Cl.
  *B60Q 9/00*  (2006.01)
  *H02H 1/00*  (2006.01)
  *B60L 1/00*  (2006.01)
  *B60L 3/04*  (2006.01)
  *B60L 3/12*  (2006.01)

(52) U.S. Cl.
  CPC ............ *Y02T 10/7291* (2013.01); *Y02T 90/16* (2013.01); *Y02T 90/162* (2013.01)

(56) References Cited

FOREIGN PATENT DOCUMENTS

| KR | 10-2012-0050278 A | 5/2012 |
| KR | 10-2012-0055422 A | 5/2012 |
| KR | 10-2012-0060631 A | 6/2012 |

\* cited by examiner

APPARATUS FOR PROTECTING PASSENGER FROM DAMAGE OF BATTERY BY LIGHTNING AND METHOD OF THE SAME

CROSS-REFERENCE TO RELATED APPLICATION

This application is based on and claims the benefit of priority to Korean Patent Application No. 10-2014-0163623, filed on Nov. 21, 2014 in the Korean Intellectual Property Office, the disclosure of which is incorporated herein in its entirety by reference.

TECHNICAL FIELD

The present disclosure relates to an apparatus for protecting a passenger for protecting a passenger (driver) who boards a vehicle from lightning and a method thereof, and more particularly, to an apparatus for safely protecting a driver who boards a vehicle from harmful gas due to a damage of a battery of the vehicle when the battery is damaged by lightning and a method thereof.

BACKGROUND

When a vehicle is struck by lightning, a large current mainly flows in a tire through a surface of a vehicle. Therefore, it has been widely known that at the time of lightning, an inside of the vehicle in which an engine stalls is a safe evacuation site. At present, a national agency and the press recommend people to be evacuated into a vehicle when lightning is generated in the open air.

Meanwhile, in the case of an electric vehicle in which a large number of battery cells are equipped, a battery may be often equipped at a suspension of a vehicle and an under floor adjacent to a tire.

However, when the battery is equipped at the under floor of the vehicle, the equipped battery may be at a lower surface of the vehicle and may be adjacent to the suspension and the tire and therefore at the time of lightning, the battery may be damaged due to the large current. For example, the battery at the under floor is a metal conductor adjacent to the tire, and therefore may be a path in which a large current (a maximum of about 50,000 A) flows. As a result, the battery may be partially melted and an electrolyte of the battery may be leaked.

When the electrolyte of the battery is leaked, electrolyte gas may be introduced into a passenger room of the vehicle and thus a driver may be defenselessly exposed to the harmful gas. That is, in the case of the electric vehicle, a driver may be protected from a large current at the time of lightning, but an apparatus for protecting a driver from harmful gas due to a damage of a battery is not yet prepared.

SUMMARY OF THE INVENTION

The present disclosure has been made to solve the above-mentioned problems occurring in the prior art while advantages achieved by the prior art are maintained intact.

An aspect of the present disclosure provides an apparatus for protecting a driver (passenger) from harmful gas which is generated due to a damage of a battery by lightning.

According to an exemplary embodiment of the present disclosure, an apparatus for protecting a passenger includes a receiver configured to receive positional information of a vehicle and weather information, a gas detection sensor configured to detect electrolyte gas within a battery duct, an air pressure sensor configured to detect an air pressure of tire, and a controller configured to control an opening and closing of the battery duct depending on the positional information, the weather information, the detected result of the gas detection sensor, and the detected result of the air pressure sensor.

According to an exemplary embodiment of the present disclosure, a method for protecting a passenger includes a first step of closing a battery duct when an engine of a vehicle stalls in an area to which lightning watch is issued, and a second step of controlling an opening and closing of the battery duct depending on a change of an air pressure of tire and a detection amount of electrolyte gas within the battery duct, when the engine of the vehicle starts.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE INVENTION

Hereinafter, exemplary embodiments of the present disclosure will be described in detail with reference to the accompanying drawings. Terms and words used in the present specification and claims are not to be construed as a general or dictionary meaning, but are to be construed as meaning and concepts meeting the technical ideas of the present disclosure based on a principle that the present inventors may appropriately define the concepts of terms in order to describe their disclosures in best mode. Therefore, configurations described in exemplary embodiments and the accompanying drawings of the present specification do not represent all of the technical spirits of the present disclosure, but are merely most preferable embodiments. Therefore, the present disclosure should be construed as including all the changes, equivalents, and substitutions included in the spirit and scope of the present disclosure at the time of filing this application.

Figure 1:
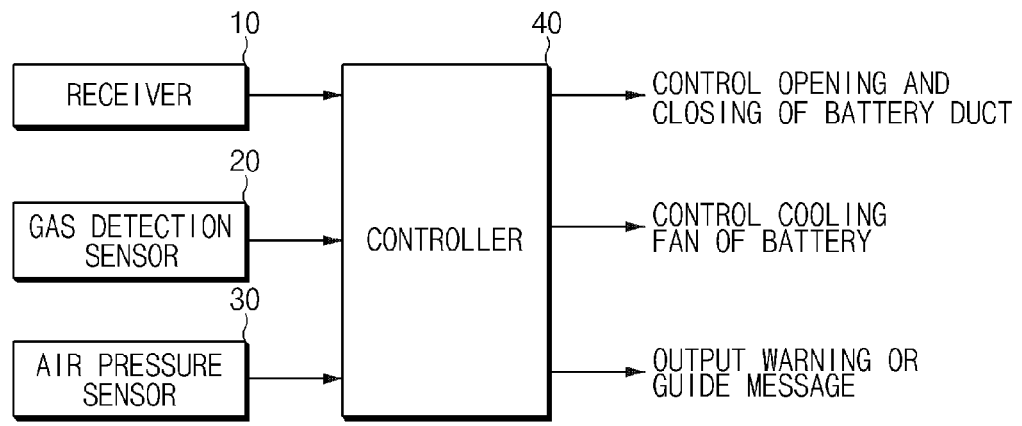
FIG. 1 is a configuration diagram of an apparatus for protecting a passenger from a damage of a battery by lightning according to an exemplary embodiment of the present disclosure.

FIG. 1 is a configuration diagram of an apparatus for protecting a passenger from a damage of a battery by lightning according to an exemplary embodiment of the present disclosure.

An apparatus for protecting a passenger of FIG. 1 includes a receiver 10, a gas detection sensor 20, an air pressure sensor 30, and a controller 40.

The receiver 10 receives positional information of a vehicle and weather information from external devices and outputs the received positional information and weather information to the controller 40. For example, the receiver 10 may receive the positional information of the vehicle from a GPS satellite through wireless communication and receive the weather information corresponding to the positional information of the vehicle from a meteorological office server.

The gas detection sensor 20 is positioned in a battery duct in which a battery is installed and detects whether electrolyte gas is present in the battery duct and outputs the detected result to the controller 40.

The air pressure sensor 30 detects an air pressure of tire of the vehicle and outputs the detected result to the controller 40.

The controller 40 controls an opening and closing of the battery duct depending on the positional information and the weather information received through the receiver 10 and values sensed by the gas detection sensor 20 and the air pressure sensor 30. For example, the controller 40 uses the positional information and the weather information to confirm whether the vehicle moves to an area to which a lightning watch is issued. The controller 40 closes the battery duct of the vehicle to block a channel between a passenger room and the battery duct when the engine stalls in the area to which the lightning watch is issued. Further, when the engine stalls, the controller 40 uses the gas detection sensor 20 to sense the air pressure of tire and then stores the sensed value. Further, when the driver starts up the vehicle, the controller 40 senses the air pressure of tire using the air pressure sensor 30 and then compares the sensed value with the stored value when the engine stalls to control whether the battery duct is opened or closed and a warning is output depending on the compared result. Further, when the driver starts up the vehicle, the controller confirms whether the electrolyte gas is present in the battery duct suing the gas detection sensor 20 in the state in which a cooling fan of the battery duct is weakly driven (one stage driving) and controls whether the battery duct is opened or closed and the warning is output depending on the result.

Figure 2:
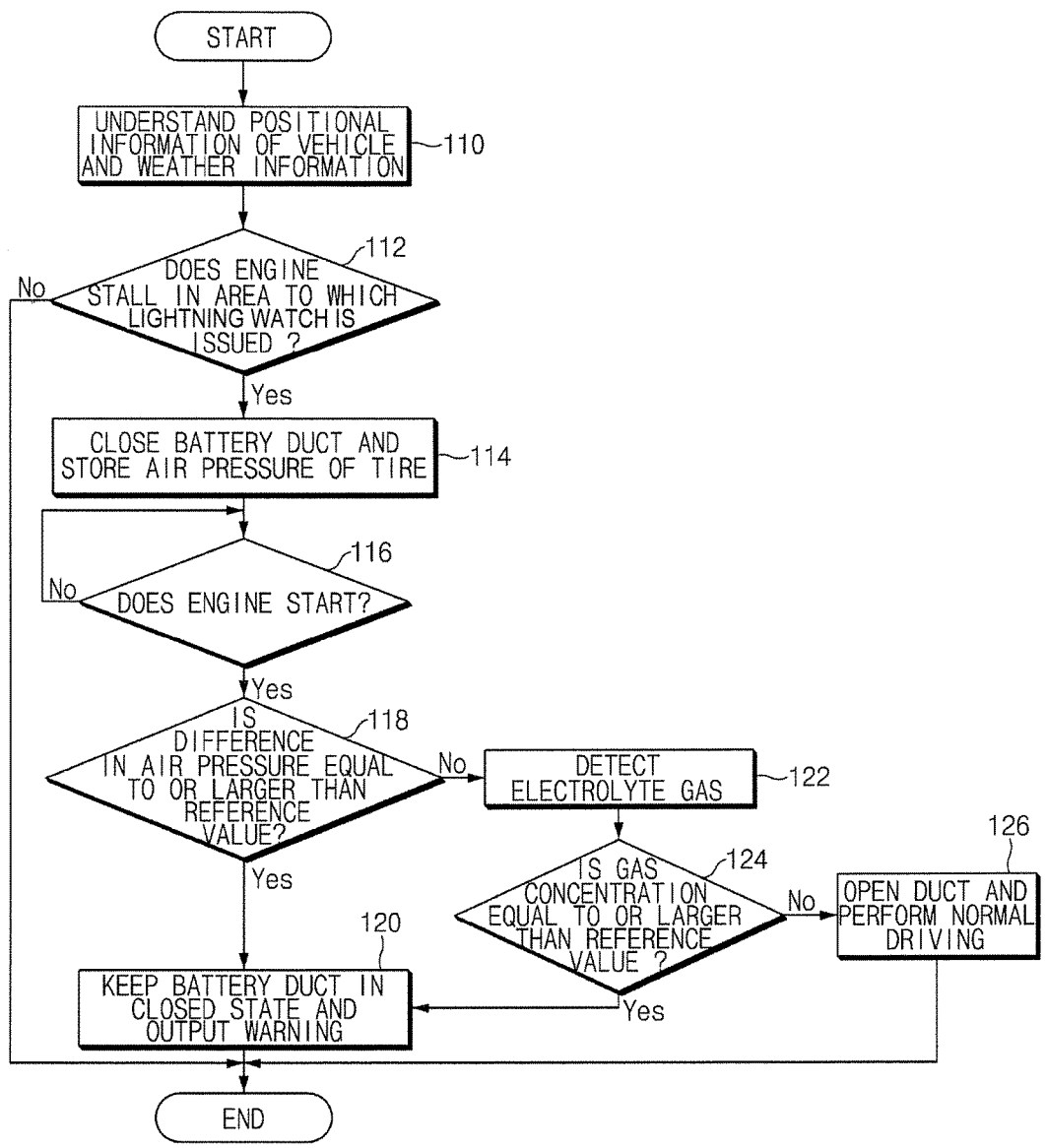
FIG. 2 is a flow chart of a method for protecting a passenger from a damage of a battery by lightning according to an exemplary embodiment of the present disclosure.

FIG. 2 is a flow chart of a method for protecting a passenger from a damage of a battery by lightning according to an exemplary embodiment of the present disclosure.

The controller 40 of the apparatus for protecting a passenger uses the receiver 10 to figure out the weather information on a current position and the corresponding position of the vehicle (Step 110).

For example, when receiving the positional information from the GPS satellite through the receiver 10, the controller 40 may communicate with the meteorological office server (or server of a weather information provider) to receive the weather information on the corresponding positional information. Alternatively, when the controller 40 is linked with a navigation device of the vehicle to allow a driver to input a designation to the navigation device, the controller 40 requests the meteorological office server of the weather information on the corresponding designation.

The controller 40 uses the positional information and the weather information to confirm whether the driver starts up the vehicle in the area to which the lightning watch is issued (Step 112).

When the starting off of the vehicle is sensed in the area to which the lightning watch is issued, the controller 40 closes the battery duct and measures the air pressure of tire using the air pressure sensor 30 and then stores the measured value (Step 114).

That is, when the controller 40 is not applied with power due to the starting off of the vehicle and may not perform a control operation, the controller 40 closes the battery duct in advance to prevent the electrolyte gas from being introduced into the passenger room of the vehicle due to the damage of the battery by lightning which is likely to be generated.

Next, if it is determined that the vehicle starts (Step 116), the controller 40 measures the air pressure of tire using the air pressure sensor 30 and then compares the measured air pressure with the air pressure of tire which is measured when the engine stalls and stored (S118).

As the comparison result, when a difference between the current air pressure of tire and the stored air pressure of tire when the engine stalls is larger than or equal to a preset reference value, the controller 40 determines that the tire is damaged by lightning and outputs a warning message informing that the stopping and checking of the vehicle are required in the state in which the battery duct is kept in the closed state (Step 120).

The warning message may be output as any one of a warning light, a warning message, a warning sound, and the like.

As the comparison result of Step 118, when the difference between the current air pressure of tire and the stored air pressure of tire when the engine stalls is smaller than the preset reference value, the controller 40 weakly drives the cooling fan of the battery and then detects the electrolyte gas through the gas detection sensor 20 for a preset predetermined time while outputting the message informing that the vehicle is being checked (Step 122).

That is, to confirm whether the electrolyte gas due to the damage of the battery by lightning is leaked, the controller 40 drives the cooling fan of the battery in one stage to detect whether the electrolyte gas is present in the battery duct for a predetermined time while circulating the air within the battery duct. In this case, the reason of driving the cooling fan of the battery is to circulate the air within the battery duct so as to more rapidly conform whether the electrolyte gas is present. As such, the controller 40 outputs the message informing that the vehicle is being checked to the driver while it is investigated whether the electrolyte gas is leaked.

As the checked result in Step 122, when the detected amount of electrolyte gas is larger than or equal to the preset reference value (Step 124), the controller 40 outputs the warning message informing that the stopping and checking of the vehicle are required in the state in which the battery duct is kept in the closed state as in Step 120.

As the checking result in S122, when the detected amount of electrolyte gas is smaller than the reference value (Step 124), the controller 40 opens the battery duct and then informs the driver of the checked result that no abnormality is present to perform the normal driving of the vehicle (Step 126).

According to the foregoing exemplary embodiment, the controller 40 uses the method for primarily protecting a passenger to close the battery duct when the vehicle moves to the area to which the lightning watch is issued and then the engine stalls. Next, the controller 40 uses the method for secondarily protecting a passenger to confirm whether the air pressure of tire is changed and the electrolyte gas is leaked when the vehicle starts, thereby opening the closed battery duct when the engine stalls only in the case in which no abnormality is present.

The exemplary embodiments of the present disclosure described above have been provided for illustrative purposes. Therefore, those skilled in the art will appreciate that various modifications, alterations, substitutions, and additions are possible without departing from the scope and spirit of the disclosure as disclosed in the accompanying claims and such modifications, alterations, substitutions, and additions fall within the scope of the present disclosure.

For example, the foregoing exemplary embodiment discloses that the difference between the air pressure of tire when the engine stalls and the air pressure of tire when the vehicle starts is first compared and then it is confirmed whether the electrolyte gas is leaked, or vice versa. Further, if necessary, the process of comparing the difference between the air pressures of tire may be omitted.

That is, the controller 40 may immediately perform operations after the S122 when the vehicle starts (S116).

As described above, according to the exemplary embodiments of the present disclosure, it is possible to protect the driver (passenger) from the harmful gas which is generated due to the damage of the battery by lightning.

What is claimed is:

1. An apparatus for protecting a passenger, comprising:
a receiver receiving positional information of a vehicle and weather information;
a gas detection sensor positioned in a battery duct and detecting an electrolyte gas;
an air pressure sensor detecting an air pressure of a tire; and
a controller controlling an opening and closing of the battery duct depending on the positional information, the weather information, the detected result of the gas detection sensor, and the detected result of the air pressure sensor.

2. The apparatus according to claim 1, wherein the controller uses the positional information and the weather information to close the battery duct when an engine stalls in an area to which lightning watch is issued.

3. The apparatus according to claim 2, wherein the controller stores a first air pressure of the tire of the vehicle which is measured by the air pressure sensor when the engine stalls.

4. The apparatus according to claim 3, wherein the controller controls the air pressure sensor to measure a second air pressure of the tire when the vehicle starts, compares the measured second air pressure with the stored first air pressure of the tire, and outputs a warning message in a state in which the battery duct is kept in a closed state upon determination that a difference between the first and second air pressures of the tire is larger than or equal to a preset first reference value.

5. The apparatus according to claim 4, wherein when the difference between the first and second air pressures of the tire is smaller than the first reference value, the controller controls the gas detection sensor to detect an amount of the electrolyte gas within the battery duct, and outputs the warning message in the state in which the battery duct is kept in the closed state upon determination that the detected amount is larger than or equal to a preset second reference value.

6. The apparatus according to claim 5, wherein the controller drives a cooling fan of the battery duct when the electrolyte gas within the battery duct is detected.

7. The apparatus according to claim 5, wherein the controller detects the electrolyte gas within the battery duct for a preset predetermined time and outputs a message informing a vehicle checking to a driver during the detection.

8. The apparatus according to claim 5, wherein the controller opens the battery duct when the detected amount of the electrolyte gas is smaller than the second reference value.

9. The apparatus according to claim 2, wherein the controller uses the gas detection sensor to detect an amount of the electrolyte gas within the battery duct when the vehicle starts, so as to output a warning message in a state in which the battery duct is kept in a closed state when it is determined that the detected amount is larger than or equal to a preset second reference value.

10. The apparatus according to claim 9, wherein the controller drives a cooling fan of the battery duct when the electrolyte gas within the battery duct is detected.

11. The apparatus according to claim 9, wherein the controller detects the electrolyte gas within the battery duct for a preset predetermined time and outputs a message informing a vehicle checking to a driver during the detection.

12. The apparatus according to claim 9, wherein the controller opens the battery duct when the detected amount of the electrolyte gas is smaller than the second reference value.

* * * * *